United States Patent
Mannepalli et al.

(10) Patent No.: US 7,372,816 B2
(45) Date of Patent: *May 13, 2008

(54) METHOD AND APPARATUS FOR OPTIMIZING ROUTING THROUGH NETWORK NODES

(75) Inventors: Rao Y. Mannepalli, Sayreville, NJ (US); Vedha Ramanujam, Ocean, NJ (US); Yuh-mei Marie Liou, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 622 days.

This patent is subject to a terminal disclaimer.

(21) Appl. No.: 10/974,333

(22) Filed: Oct. 27, 2004

(65) Prior Publication Data

US 2005/0060400 A1   Mar. 17, 2005

Related U.S. Application Data

(63) Continuation of application No. 09/503,386, filed on Feb. 14, 2000, now Pat. No. 6,842,425.

(51) Int. Cl.
*H04L 12/28* (2006.01)

(52) U.S. Cl. .................. 370/238; 709/241

(58) Field of Classification Search ............ 370/238, 370/255, 351, 252; 709/241, 238
See application file for complete search history.

(56) References Cited

U.S. PATENT DOCUMENTS

| 5,495,479 | A | * | 2/1996 | Galaand et al. ........... 370/404 |
| 5,781,624 | A |   | 7/1998 | Mitra et al. ............... 379/244 |
| 5,848,145 | A |   | 12/1998 | Gallagher et al. ......... 379/220 |
| 5,854,903 | A |   | 12/1998 | Morrison et al. ...... 395/200.79 |
| 6,351,641 | B2 | * | 2/2002 | Verkama ................. 455/426.1 |
| 6,842,425 | B1 | * | 1/2005 | Mannepalli et al. ....... 370/238 |

FOREIGN PATENT DOCUMENTS

| EP | 0 673 135 A1 | 9/1995 |
| EP | 0 868 097 A2 | 3/1998 |

* cited by examiner

*Primary Examiner*—Min Jung (57) ABSTRACT

A method for reducing the problem space associated with determining intra-network circuit provisioning paths within a large communications network by selecting only a sub-set of the total network nodes, including the start-node and end-node of a communication path by bounding, using one of a plurality of predefined shapes having an appropriate size, and calculating the best path using only the network elements included within the sub-set of total nodes.

10 Claims, 9 Drawing Sheets

METHOD AND APPARATUS FOR OPTIMIZING ROUTING THROUGH NETWORK NODES

RELATED APPLICATION

This application is a continuation of U.S. patent application Ser. No. 09/503,386, filed Feb. 14, 2000, now U.S. Pat. No. 6,842,425 which is hereby incorporated by reference in its entirety.

TECHNICAL FIELD

The invention relates to the field of communication systems and, more specifically, to determining an appropriate communication path between a start-node and an end-node in a communication system comprising a relatively large number of nodes.

BACKGROUND OF THE INVENTION

Telecommunication networks and other networks are increasing in both size and complexity. It is anticipated that this trend will continue such that very large telecommunication networks (greater than 25,000 nodes) will become commonplace in the not too distant future. Unfortunately, as such networks increase in size, the network management function also increases in complexity. This means that critical tasks such as provisioning (allocating resources to form a communications link), restoration, reinstatement and the like must be completed in a reasonable time using network management tools available to a network manager at a single location.

In a manual provisioning mode, an operator specifies all details of a circuit such as end points, all links, time slots and all network elements. The manual provisioning mode allows the operator to select a particular circuit for routing a communication, such as a telephone call or other communication. However, the manual provisioning mode is slow (the operator must select all links manually) and error prone (the operator may make an error in selecting these links).

In an automatic provisioning mode the operator specifies end points (i.e. start node and end node) and type of circuit needed to provide the desired communication. A network manager system responsively examines all of the spare resources available in the network and selects the optimum path for the requested circuit. This automatic provisioning mode requires the identification of all spare resources such as channels and communication links from a data base, the constructing of a graphical or other depiction of the spare resources within computer memory and the execution of a shortest path algorithm to find the optimum route.

Unfortunately, while the automatic provisioning mode is a dramatic improvement over the manual provisioning mode, the automatic provisioning mode tends to have some drawbacks. Specifically, in an automatic provisioning mode such as presently used in the art, the system loads all available spare resources (i.e., channels) in the network into memory, the details of each of the spare resources being kept in a data base of the network management system. For a network of 25,000 nodes and average connectivity of 10 links per node, 250,000 spares are to be loaded from a data base used by the network manager system. This produces the following shortcomings: (1) large amounts of data must be retrieved from the data base (e.g., 250,000 links); (2) large amounts of data must be stored in the main memory of a computer or work station utilized by the network operator (data associated with the 250,000 links); (3) large amounts of time are required to build a graph of the network in the computer memory; (4) large amounts of time are required to run the shortest path or optimum path algorithm to find the appropriate communications path within the network; (5) the size of the program implementing the automatic provisioning task is relatively large, thereby requiring more powerful computers in terms of both hardware, memory and other parameters which increase system cost; (6) due to the large size of the system required, the network manager and element manager typically need separate computer systems; and (7) the data base in which resource data is stored must be "locked" during the above-described automatic provisioning process, thereby reducing throughput of the network management system (i.e., reducing the number of circuits provisioned per hour by all operators using that system). Due to the above disadvantages, network operators most of the time use manual provisioning modes in spite of the disadvantages with the manual provisioning mode.

It is noted that the above disadvantages of the automatic provisioning mode are exacerbated by increasing the size of the network to be provisioned.

SUMMARY OF THE INVENTION

The invention comprises a method for reducing the problem space associated with intra-network circuit provisioning within a large telecommunications network such that computation complexity and time may be reduced while providing appropriate results.

Specifically, in a system for managing a communications network comprising a plurality of nodes, a method according to the present invention for determining a communication link between a start-node and an end-node comprises the steps of: representing each node within the network according to its respective geographic position; defining a window comprising the start-node, the end-node and a plurality of intervening nodes, each of the start-node, end-node and intervening nodes having at least one communication link to a respective adjacent node; calculating, using the nodes included within the windows, a shortest communication path between the start-node and the end-node.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

The subject invention will be described within the context of a telecommunication system comprising a large number of network elements or nodes. However, it will be appreciated by those skilled in the art that the subject invention may be advantageously employed in any communications network in which the determination of an appropriate route for communication between a start-node and an end-node must be calculated. Moreover, it will be appreciated by those skilled in the art that any form of communication may be utilized, such as telecommunication, data communication, streaming media communication and the like. Thus, it is contemplated by the inventors that the subject invention has broad applicability beyond the telecommunication network described herein. Specifically, the subject invention is applicable to the management of any multi-node communication network, regardless of the number of network elements deployed in the communication network or the type of communication links utilized by the communication network. The subject invention provides significant advantages within the context of the management of a very large network. For example, in the case of a 25,000 node network, the subject invention operates to reduce the number of communications links to be considered from, approximately, 250,000 links to, approximately, 7,500 to 12,500 communications links.

The invention advantageously simplifies the number of networks needed to provide provisioning, restoration and reinstatement management services. Provisioning comprises the process of selecting the start and end points (nodes) of a communication path, selecting all the nodes and links connecting the start and end nodes, finding the "best" communication path between the start and end nodes, and generating the commands to each of the nodes within the "best" path such that cross connects within the network cause the path to be formed such that traffic may flow through the provisioned circuit. Restoration is the process of selecting an alternate path in the event of a break in the originally provisioned circuit. In response to such a break, commands are generated to cause new network elements to create the alternate communications path and to cause network elements forming the initially provisioned communications path to disconnect. Reinstatement is the process of restoring the originally provisioned circuit after the circuit break or other anomaly resulting in a restoration process has been resolved.

In a manual provisioning mode, a user or network operator selects, using a graphical user interface (GUI) a start-node and an end-node on a graphically displayed network map. The user then selects each link in a communications path between the start-node and end-node and sends a request to a host computer to retrieve a list of spare channels on each selected link. The list of spare channels is displayed in a table. The user then selects each channel to be used in forming the provisioned circuit. After selecting sufficient channels to provision the circuit, a request for information regarding the available time slots (units) on each selected channel is transmitted to the host. The user then selects the required time slots using the GUI. This procedure must be repeated for each link in the communications path to be provisioned, which may comprise up to 80 links or more.

After selecting the channel and time slot for each link between the start-node and end-node, the host computer arranges the selected links (i.e., the selected channel and time slot for each link) in the correct order and sends commands to each network element which, when implemented, result in the provisioning of the cross-connects and other network elements forming the complete communication path between the start-node and end-node. At this point, traffic may flow through the circuit.

Unfortunately, the above-described manual provisioning process is extremely unwieldy and almost impossible to use within large networks due to the difficulty in picking or selecting the various links presented on a network map (too many options or links to choose from). Additionally, the manual provisioning method is interactive, since the selection of links is dependent on the resources available form the network manager data base. That is, the user may select only those channels and time slots that are available, and information pertaining to the availability of these channels and time slots rapidly changes within the system. Additionally, very large amounts of data must be sent between the network manager and the graphical user interface, this amount of data increasing exponentially with the size of the network. Finally, manual provisioning cannot be used when a network manager is managed by a service manager through which provisioning parameters are obtained from the user. That is, the provisioning of a circuit is a network management layer function within the telecommunications management network (TMN) standards, described in more detail in international telecommunications unit (ITU) standard documents such as recommendation M.3010 and related documents, which are incorporated herein by reference in their entireties. It is noted that the TMN functional layers also include a service management layer which is above, and interacts with, the network management layer. Therefore, in the case of TMN management at the service management layer, the network management layer functions may not be performed manually.

Figure 1:
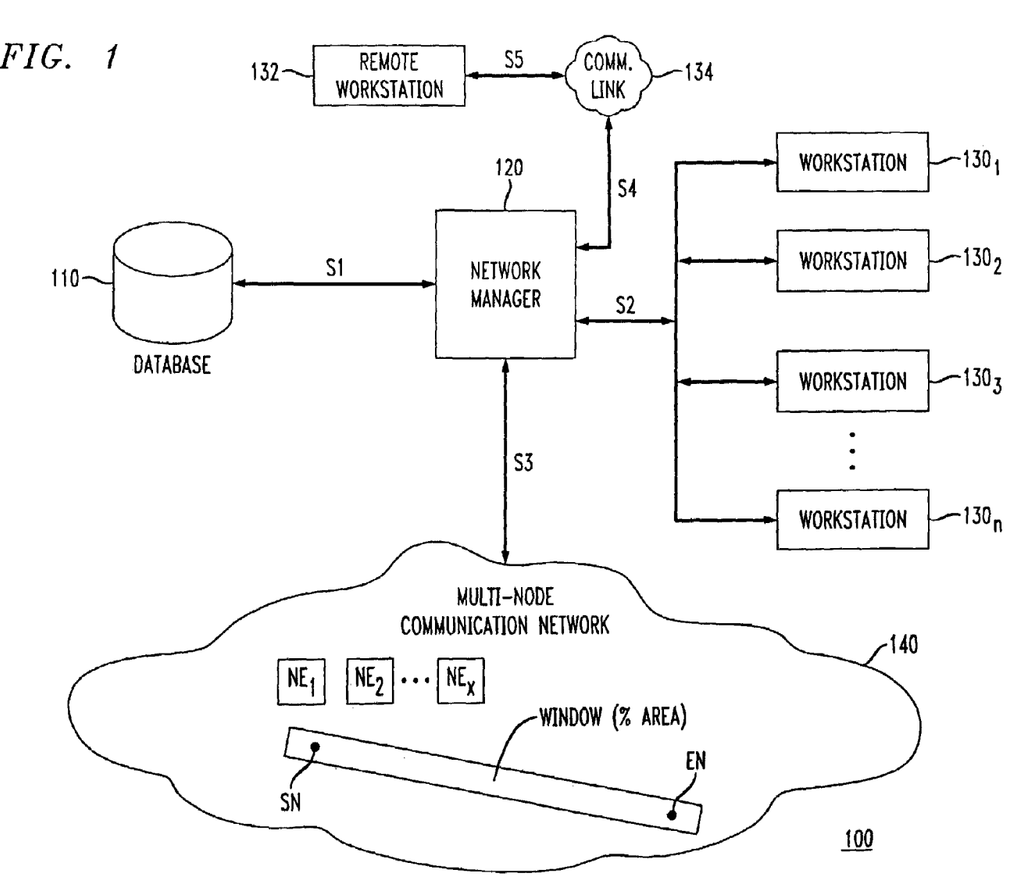
FIG. 1 depicts a high level block diagram of a communications system including the present invention.

FIG. 1 depicts a high level block diagram of a communications system including the present invention. Specifically, the communications system 100 of FIG. 1 comprises a data base 110, a network manager or controller 120, a plurality of work stations 130$_1$ through 130$_n$ (collectively work stations 130) a remote work station 132, a communications link 134 and a multi-node communication network 140.

The multi-node communication network 140 comprises a plurality of network elements (NE) denoted as network elements NE$_1$ through NE$_x$ (collectively network elements NE). Also depicted is a start-node SN and an end-node EN within a window defined in terms of % Area. As will be discussed in more detail below with respect to FIGS. 3-11, rather than processing information associated with each of the network elements, NE$_1$ through NE$_x$ to determine the shortest communication path between the start-node SN and the end-node EN, the method operates to define a sub-set of network elements (i.e., those bounded by a window of predefined shape and size) and process information associated with only the selected network elements. In this manner, computational efficiency is dramatically increased while providing very good results in terms of selecting appropriate paths for communications between start-nodes SN and end-nodes EN.

The multi-node communication 140 is coupled to the network manager 120 via signal path S3. The network manager 120 is used to manage various network operations such as the routing of communications and other functions. Specifically, in one embodiment of the invention, the multi-node communication network 140 comprises a large number of network elements where each communication to be transmitted from a start network element or start-node to an end network element or end-node requires the determination by the network manager 120 of an appropriate communications path.

The data base 110 may comprise a standard mass storage device, such as a redundant array of inexpensive devices (RAID) or other known mass storage device. All that is necessary is that the data base 110 be able to communicate with the network manager 120 in a manner facilitating the storage and retrieval of information, such as characterization and control information pertaining to the multi-node communication network 140.

Each of the work stations 130 communicates with the network manager 120 via, for example, a computer network. Similarly, remote work station 132 communicates with the network manager 120 via a communication link 134. In the embodiment of FIG. 1, the remote work station 132 communicates with communication link 134 via a signal path S5, while communication link 134 communicates with the network manager 120 via a signal path S4. The communication link 134 along with the signal paths S4 and S5 form a communication link between the remote work station 132 and the network manager 120. It will be appreciated by those skilled in the art that more or fewer work stations 130 or remote work stations 132 may be provided within the network management system 100 of FIG. 1.

Each of the work stations 130 and remote work station 132 may comprise, for example, a terminal used by a network operator to request the provisioning of communication circuits between start-nodes and end-nodes in response to, for example, requests for such circuits from network users. The work stations 130 and remote work station 132 may also comprise interfaces between network system users and customers and the network manager 120. In this embodiment, speech synthesis and/or speech-to-text technologies are employed to effect a user interface in which network management operators may request and receive communication links or paths between desired network elements.

The network manager 120 and data base 110 of the communications system 100 of FIG. 1 are depicted as separate functional entities. However, it will be appreciated by those skilled in the art that the network manager 120 and data base 110 may be combined within a single functional entity. Thus, the network manager 120 and data base 110 may be operably combined to form a network management apparatus suitable for managing the multi-node communication network 140 according to the present invention.

In one embodiment of the invention, the network manager 120 comprises, illustratively, an Integrated Transport Management Network Manager (ITM-NM) manufactured by Lucent Technologies, Inc. of Murray Hill, N.J. In this embodiment, the network manager 120 implements network management layer functions according to, for example, the Telecommunications Management Network (TMN) standards described in the International Telecommunications Union (ITU) recommendation M.3010 and related documents, which are incorporated herein by reference in their entirety. Thus, the network manager 120 is used to manage all network elements within the communications system 100 of FIG. 1, both individually and as a set of network elements. The network manager 120 can include or be operatively coupled to various element management systems (not shown) according to the various management layer functions described in the TMN standard.

Figure 2:
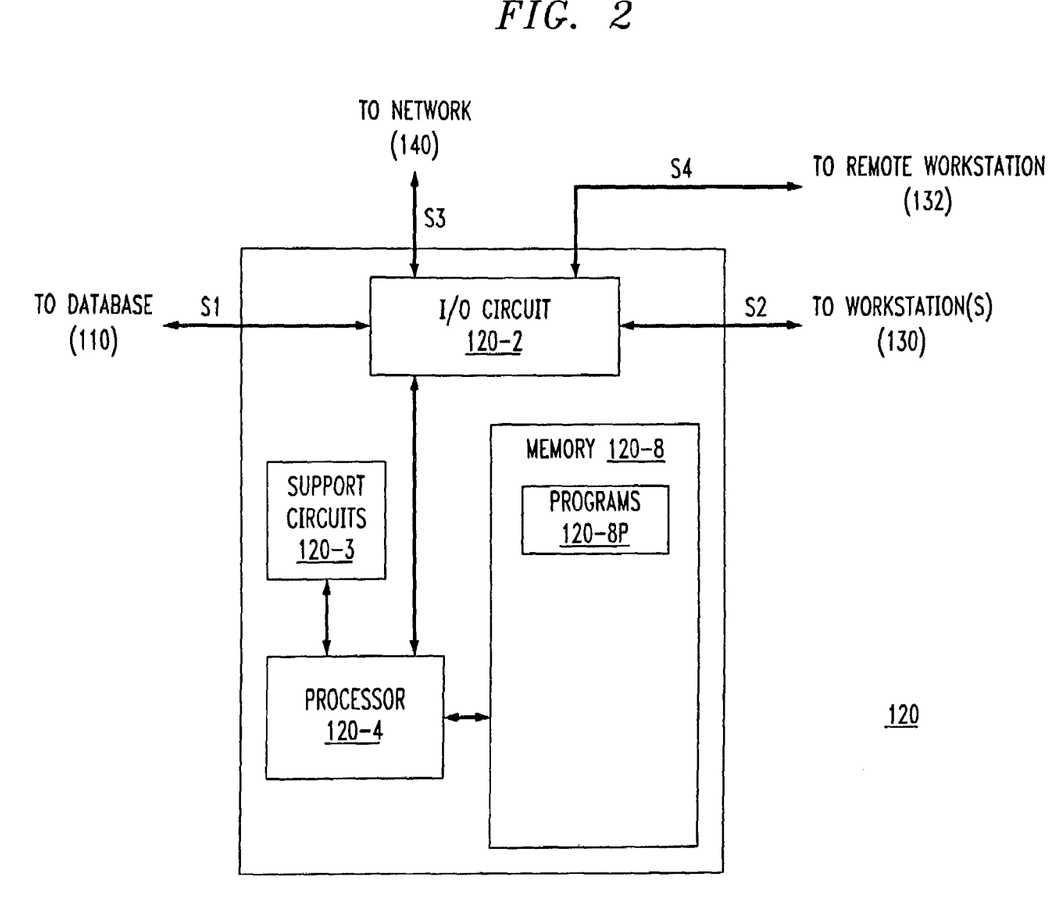
FIG. 2 depicts a high level block diagram of a network manager suitable for use in the communications system of FIG. 1.

FIG. 2 depicts a high level block diagram of a network manager or controller suitable for use in the communications system 100 of FIG. 1. Specifically, the exemplary network manager or controller 120 of FIG. 2 comprises a processor 120-4 as well as memory 120-8 for storing various network management and control programs 120-8P. The processor 120-4 cooperates with conventional support circuitry 120-3 such as power supplies, clock circuits, cache memory and the like as well as circuits that assist in executing the software routines stored in the memory 120-8. As such, it is contemplated that some of the process steps discussed herein as software processes may be implemented within hardware, for example, as circuitry that cooperates with the processor 120-4 to perform various steps. The network manager 120 also contains input-output circuitry 120-2 that forms an interface between the various functional elements communicating with the network manager 120. For example, in the embodiment of FIG. 1, the network manager 120 communicates with a data base 110 via a signal path S1, each of a plurality of work stations 130 via signal path S2, the communication network to be managed 140 via signal path S3, and a remote work station 132 via signal path S4.

Although the network manager 120 of FIG. 2 is depicted as a general purpose computer that is programmed to perform various network management functions in accordance with the present invention, the invention can be implemented in hardware as, for example, an application specific integrated circuit (ASIC). As such, the process steps described herein are intended to be broadly interpreted as being equivalently performed by software, hardware, or a combination thereof.

The network manager 120 of the present invention communicates with the various work stations 130, 132, such as those being used by network operators servicing customers requesting specific connections.

Figure 4:
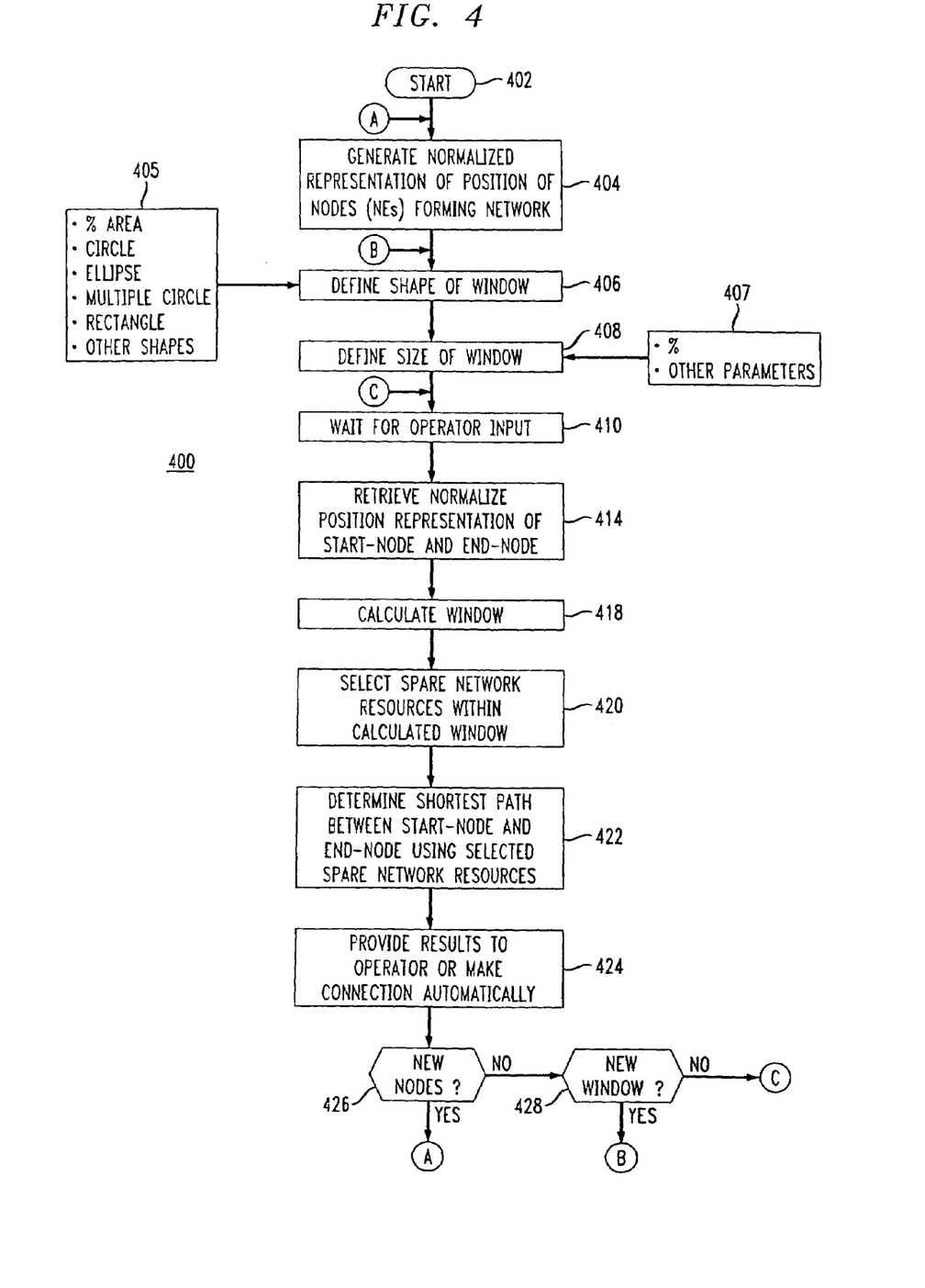
FIG. 4 depicts a flow diagram of a method for provisioning a circuit according to the invention.

FIG. 4 depicts a flow diagram of a method for provisioning a circuit (i.e., determining the optimum routing of a communication link between a start-node and an end-node) according to the invention. The method 400 of FIG. 4 may be stored in the network manager or controller 120 in, for example, memory 120-8 within the portion used for storage of various programs 120-8P. The method 400 receives operator input from the work stations 130 or remote work station 132 indicative of a desire to form a communications link between a start-node SN (or network element) and an end-node $E_n$ (or network element) within the network 140. The method 400 selects a sub-set of the network elements within the network including the starting and ending network elements, and processes the selected sub-set to identify appropriate spare network resources for use in forming a communications path or provisioning a circuit between the start node and end node using a shortest path routine. This information is then passed to the work station 130 or remote work station 132 for subsequent processing. Alternatively, the network manager 120 automatically makes the connection between the start-node and end-node.

The method 400 is entered at step 402 and proceeds to step 404, where a normalized representation of the position of each node or network element forming the network 140 is generated. It should be noted that step 404 may be performed once after a network 140 has been provided. The normalized representation of the position of nodes within the network is then stored in, for example, data base 110. An exemplary method for performing step 404 will be described below with respect to FIG. 5. Briefly, as noted above with respect to FIG. 3, a network 140 may be represented as normalized Easting ($E_n$) and Northing ($N_n$) coordinates. All that is necessary for the practice of the invention is that a suitable representation of the geographic position of network elements or nodes, or of the relative position of the network elements or nodes to each other is provided. In this manner, an appropriate sub-set of network elements or nodes may be selected such that reduced complexity provisioning circuit calculations may be performed, as described in more detail below. After generating the normalized representation of the nodes or network elements forming the network 140, the method 400 proceeds to step 406.

At step 406 the shape of the window to be used is defined. That is, at step 406 the shape of the window to be used in defining a sub-set of network elements or nodes to be selected for further processing is defined. The shape of the window is defined with respect to the shapes provided in box 405. Specifically, box 405 provides the following shapes: % Area, circle, ellipse, multiple circle, rectangle, permutations of the above and other shapes. It is noted by the inventors that in the preferred embodiment the % Area shape has been found to deliver very goods results. The method 400 then proceeds to step 408.

At step 408, the size of the window is defined. That is, at step 408 the size of the window. The definition of the size of the window is provided according to parameters described in box 407. Specifically, box 407 includes the following parameters: percentage of the network, and other parameters. It is noted by the inventors that in the preferred embodiment a 5% of the network's normalized geographic area is used along with the % Area shape previously described. The method 400 then proceeds to step 410.

At step 410, the method 400 waits for operator input. That is, at step 410 the network manager 120 executing the method 400 waits for input from one of the work stations 130 or remote work station 132 indicative of a need to provision a circuit or otherwise form a communication path between a start-node or network element and an end node or network element. The network operator may select two particular nodes within the network to operate a start-node and end-node. The selection may be performed by textually specifying the nodes, selecting the nodes using a graphical user interface or any other means. Upon receipt of that input, the method 400 proceeds to step 414.

At step 414, the normalized position representations of the start-node and end-node are retrieved from the data base 110. The method 400 then proceeds to step 418.

At step 418, the window defining the sub-set of network elements or nodes to be subjected to further processing is calculated. That is, a window having the shape defined at step 406 and encompassing the size defined at step 408 is calculated based upon the start-node and end-node positions retrieved at step 414. A method for calculating a window according to the % Area shape will be described in more detail below with respect to FIGS. 6 and 7. Additionally, methods for calculating windows according to the circle, ellipse, multiple circle and rectangular shapes will be described below. After calculating the appropriate window, the method 400 proceeds to step 420.

At step 420, the spare network resources within the calculated window are selected. That is, those network elements or nodes and other communication resources (such as communications links) within the network 140 that are within the boundary (or have portions within the boundary) of the calculated window are selected to be used for further processing. In this manner, such further processing includes only a sub-set of the total number of network elements or other resources within the network 140, thereby reducing the time and complexity of the further processing. The method 400 then proceeds to step 422.

At step 422, the "shortest path" between the start-node and end-node is determined using the spare network resources selected at step 420. In the exemplary embodiment, the shortest path is determined using the known Dijkstra shortest path algorithm which is described in more detail by Cormen et al. in the book "Introduction to Algorithms," published by MIT Press in 1998. Other algorithms may also be used. Regardless of the algorithm selected, the reduction in the size of the problem space processed by the algorithm enables the algorithm to achieve a very good result in a relatively short period of time. After determining the shortest path between the start-node and end-node (i.e., the intervening nodes and their respective connecting links) using the selected sub-set of network resources, the method 400 proceeds to step 424.

After selecting each of the nodes or network elements (or links) at step 420, an adjacency list representation of the network may be formed for subsequent use in the Dijkstra shortest path algorithm. The adjacency list may be used to represent the network and may be generated or updated during step 404 of the method 400 of FIG. 4. The adjacency list representation utilizes a data structure denoted as NETWORK, which comprises the adjacency list representation of the network to be managed. Additionally, each node in the network is represented by a data structure denoted as NODE, while each "arc" or communications link between nodes is represented by a data structure denoted as ARC.

The data structure NETWORK comprises the maximum number of nodes, maximum number of arcs (or links) per node, the number of nodes currently stored in the data structure NETWORK and an array of nodes and arcs (or links) connected to each node. Each data structure denoted as NODE comprises: node number, #nodes adjacent to this node (i.e. #nodes which are connected to this node), length of the shortest path determined so far from the start to this node, flag to indicate that this node is already visited by the algorithm during the course of shortest path determination and predecessor node in the shortest path. The data structure ARC comprises an index of the node to which the given node is connected and length of the arc. The data structure NETWORK comprises the adjacency list representation of the network: the maximum number of nodes, the maximum number of arcs per node, the number of nodes currently stored in the data structure and an array of NODEs and ARCs connected to each node.

Dijkstra's shortest path algorithm performs substantially the following steps: (1) get the index or location of the start-node SN; (2) if the start-node SN is not in the node array, then return fail; (3) get the index or location of the end-node EN; (4) if the end-node EN is not in the node array, then return FAIL; (5) reset the initial values of the variables used for the algorithm; (6) initialize the shortest path length for the start-node SN to zero; (7) find the next node or network element to process (e.g., a node not yet processed having its current shortest path length from the start-node SN being minimal); (8) if the currently processed node is −1 or the minimum is infinity, then return FAIL (there is no shortest path); (9) if FAIL not returned at step (8), then update the adjacent node's current shortest path length and the predecessor node; (10) mark the currently processed node as having been processed; (11) if the most recently processed node comprises the end-node EN, then the shortest path has been found; (12) if the shortest path has not been found, then return to step (7) to find the next node to process; (13) if the shortest path has been found per step (11), then traverse the processed nodes forming the path, starting from the end-node and including all nodes within the shortest path; (14) arrange the nodes within the determined shortest path in reverse order (i.e., from start-node SN to end-node EN); and (15) return the determined shortest path to the calling function or method.

At step 424, the shortest path results are provided to the operator or, alternatively, a connection between the start-node and end-node is made automatically. In the case of an automatic connection, a confirmation of that connection is provided to the operator providing input at step 410. The method 400 then proceeds to step 426.

At step 426, a query is made as to whether new nodes or network elements have been added to the network 140. If the query at step 426 is answered affirmatively, then the method 400 proceeds to step 404, where a normalized representation of the position of at least the new nodes within the network 140 are determined. If the query at step 426 is answered negatively, then the method 400 proceeds to step 428.

At step 428, a query is made as to whether a new window shape or size is to be used for future resource selection. For example, if it is determined over time that particular shapes or particular sizes are more appropriate than others, the method 400 will adapt the shape and/or size of the window used to provide optimal selection of spare network resources for use in calculations. If the query at step 428 is answered affirmatively, then the method 400 proceeds to step 406. If the query at step 428 is answered negatively, then the method 400 proceeds to step 410, where the method waits for operator input.

The above-described method of FIG. 4 provides the general methodology of the subject invention. As previously noted, the normalized representation of node or network element position may be determined once and, as shown in the above method 400, updated with the addition of new nodes. It will be appreciated by those skilled in the art that the normalized representation of node or network element positions within the network may be performed by a method or routine independent of the method or routine used to determine appropriate resources to be used to provision circuits between start-nodes and end-nodes. Additionally, it will be appreciated by those skilled in the art that the shape and size of windows to be used may be adapted to the peculiar topologies of particular networks, measurements of efficiency made during the provisioning of circuits and other parameters. Thus, steps 404 through 407 and 426 through 428 of the method 400 of FIG. 4 may be considered as optional steps or modifications to the core method of the present invention, which is defined by steps 414 through 424.

Figure 5:
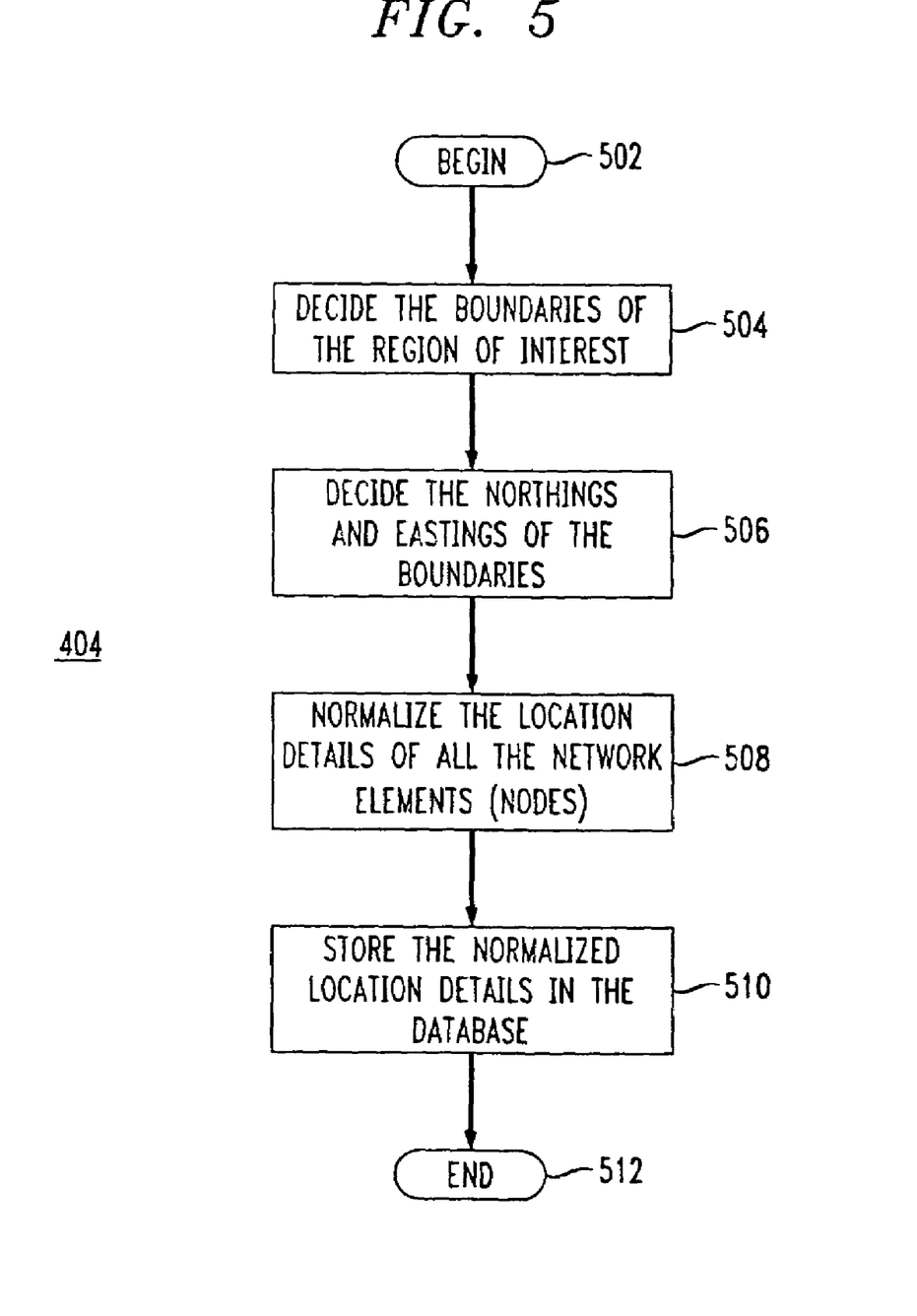
FIG. 5 depicts a flow diagram of a method for determining and normalizing the boundaries of a networks suitable for use in the method of FIG. 4.

FIG. 5 depicts a flow diagram of a method for determining and normalizing the boundaries of a network suitable for use in the method of FIG. 1. The method 404 of FIG. 5 is suitable for use in implementing step 404 of the method 400 of FIG. 4. It will be appreciated by those skilled in the art that the steps depicted below in FIG. 5 may be performed before or during the steps associated with the method 400 of FIG. 4. The method 404 of FIG. 5 provides a database of pre-processed information relating to each network element or node (and their respective communication links) within the network to be managed.

It is assumed that the network to be managed has been designed in a standard manner to provide the required capacity, reliability, performance and connectivity appropriate to the customer base and communications infrastructure. Moreover, it is assumed that the types of network elements, the capacity of the network elements and the geographic location of each network element and its interconnectivity with other network elements has been decided. Additionally, it is assumed that each of the network elements within the network to be managed is associated with a respective geographical coordinate which may be given in terms of Easting and Northing values (based on, for example, geographic surveys provided by the government of the country in which the network to be managed is located). Alternatively, the geographic coordinates of each network element may be determined using the global positioning system (GPS). Other methods for expressing or providing geographical coordinates for the network elements within the network to be managed may be used. The geographic coordinates of each network element within the network to be managed are used to identify the outer boundaries of the network. The outer boundaries may comprise a metropolitan area, a state or region within a country, an entire country, a plurality of countries or the entire world. To practice the invention, it is only necessary to know the outer boundaries of the particular network being managed.

The method 404 of FIG. 5 is entered at step 502 and proceeds to step 504, where the boundaries of the region of interest are determined. That is, at step 504 the geographic boundaries of the network (or portion thereof to be managed are determined. The geographic boundaries are defined by the geographical coordinates of all of the network elements forming the network (or network portion to be managed). Thus, the outer boundaries of the network are determined by the network elements populating the edge of the geographical region including the network and/or by the links having at least one termination to a node in the network. The method 500 then proceeds to step 506.

At step 506, the Northings and Eastings of the boundaries of the region of interest are determined. That is, at step 506 the Northings and Eastings (or GPS coordinates or other coordinates) of each of the network elements associated with the edge or boundary of the network to be managed are determined. The method 500 then proceeds to step 508.

Figure 3:
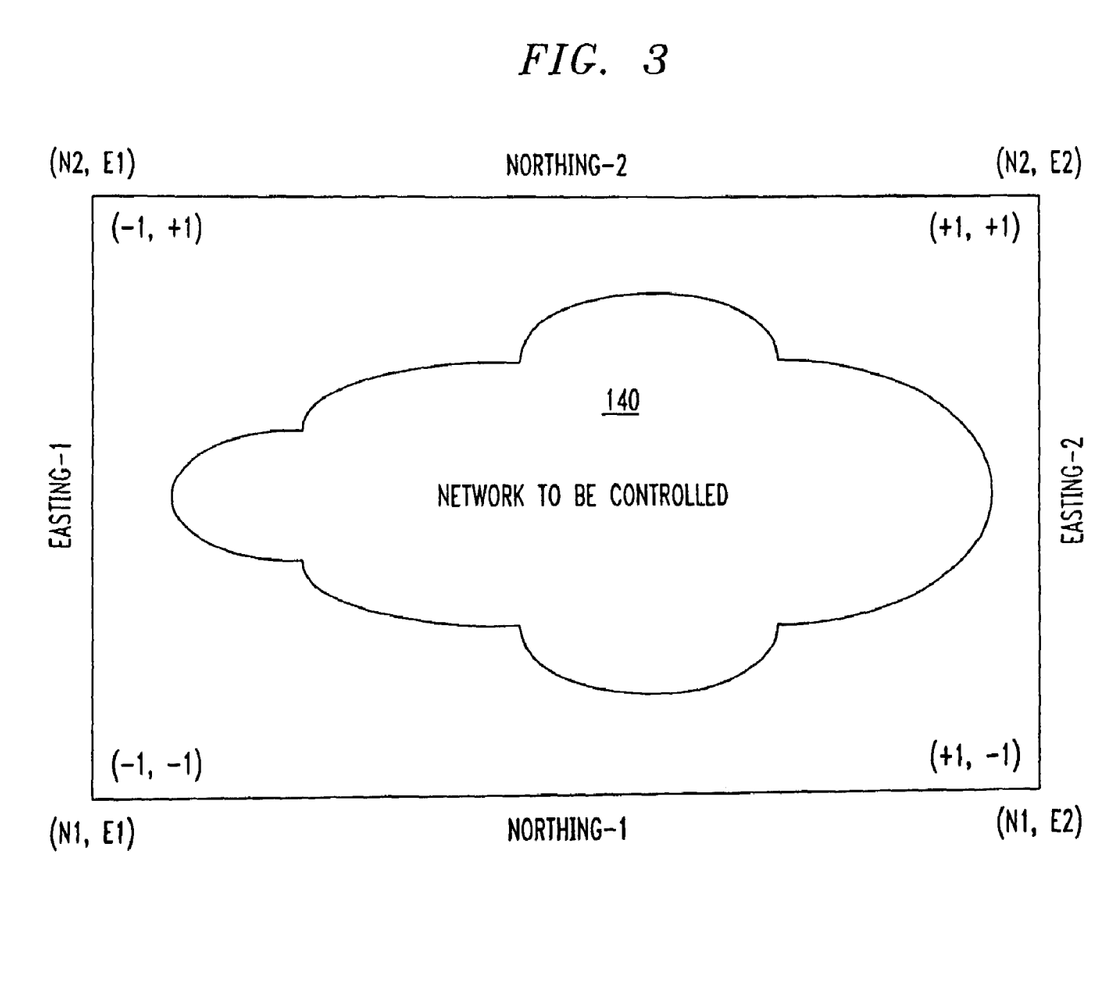
FIG. 3 depicts a graphical representation of a network having normalized geographic boundaries.

At step 508, the location details of all of the network elements or nodes within the network are normalized. That is, the boundaries of the network are normalized to be −1 to +1. This normalization is shown in FIG. 3, where the network 140 is bounded by normalizing boundaries (N1, E1), (N2, E1), (N2, E2), and (N1, E2), where N="Northing" and E="Easting."

The location of each network element within the network 140 is normalized according to equation 1 (Easting coordinates) and equation 2 (Northing coordinates), which are presented below. The method 500 then proceeds to step 510.

$$E_n = (E - E_1) + \frac{-2}{(E_2 - E_1)} \quad \text{(equation 1)}$$

$$N_n = (N - N_1) + \frac{-2}{(N_2 - N_1)} \quad \text{(equation 2)}$$

Where:
$E_n$ is the "Normalized Easting" of the network node;
E is the "Actual Easting" of the network node;
$E_1$ is the "Actual Easting-1" of the network boundary (see FIG. 3);
$E_2$ is the "Actual Easting-2" of the network boundary (see FIG. 3);

$N_n$ is the "Normalized Northing" of the network node;
N is the "Actual Northing" of the network node;
$N_1$ is the "Actual Northing-1" of the network boundary (see FIG. 3); and
$N_2$ is the "Actual Northing-2" of the network boundary (see FIG. 3).

At step 510, the normalized Easting and Northing coordinates of each network element within the network 140 to be managed are stored in the data base 110 for subsequent use by the network manager 120. The method 500 then proceeds to step 512 where it is exited.

It should be noted that each time a new network element or node is added to the network, the location details of that new network element or node are determined and normalized using Equations 1 and 2 such that the data base 110 may be updated with the normalized coordinates of each of the new network elements or nodes. In this manner, changes made to the network 140 over time may be incorporated into the data base such that processing operations used to determine appropriate provisioning or circuit paths may be readily calculated.

Figure 6:
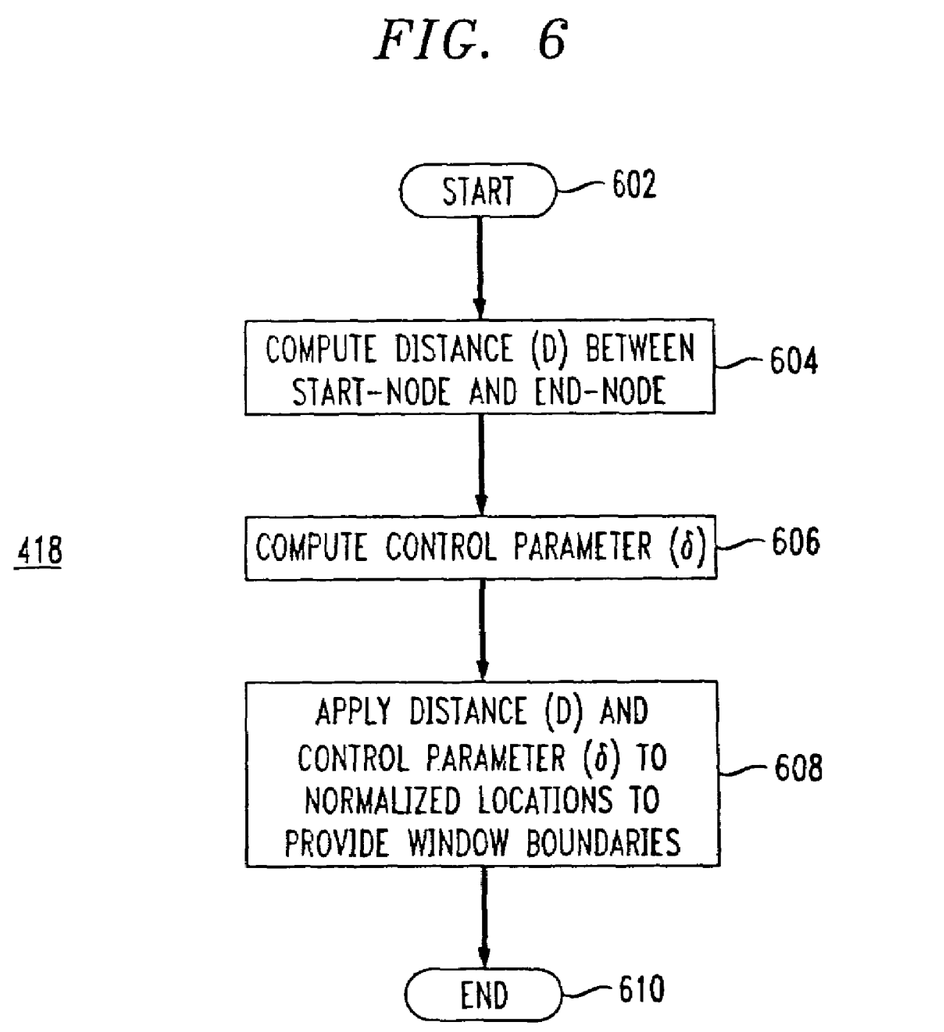
FIG. 6 depicts a flow diagram of a method of calculating a window that is suitable for use in the method of FIG. 4.

FIG. 6 depicts a flow diagram of a method of calculating a window that is suitable for use in the method of FIG. 4. Specifically, FIG. 6 depicts a flow diagram of a method for calculating a window that is suitable for use in implementing step 418 in the method 400 of FIG. 4.

The method 418 of FIG. 6 is entered at step 602 and proceeds to step 604, where the distance (D) between the start-node and end-node is determined. The method 418 then proceeds to step 606.

At step 606, a control parameter ($\delta$) is computed. The control parameter ($\delta$) is a parameter used to control the size of the window. The method 418 then proceeds to step 608.

At step 608, the control parameter ($\delta$) and the distance parameter (D) are applied to the normalized node or network element locations to provide window boundaries.

Figure 7:
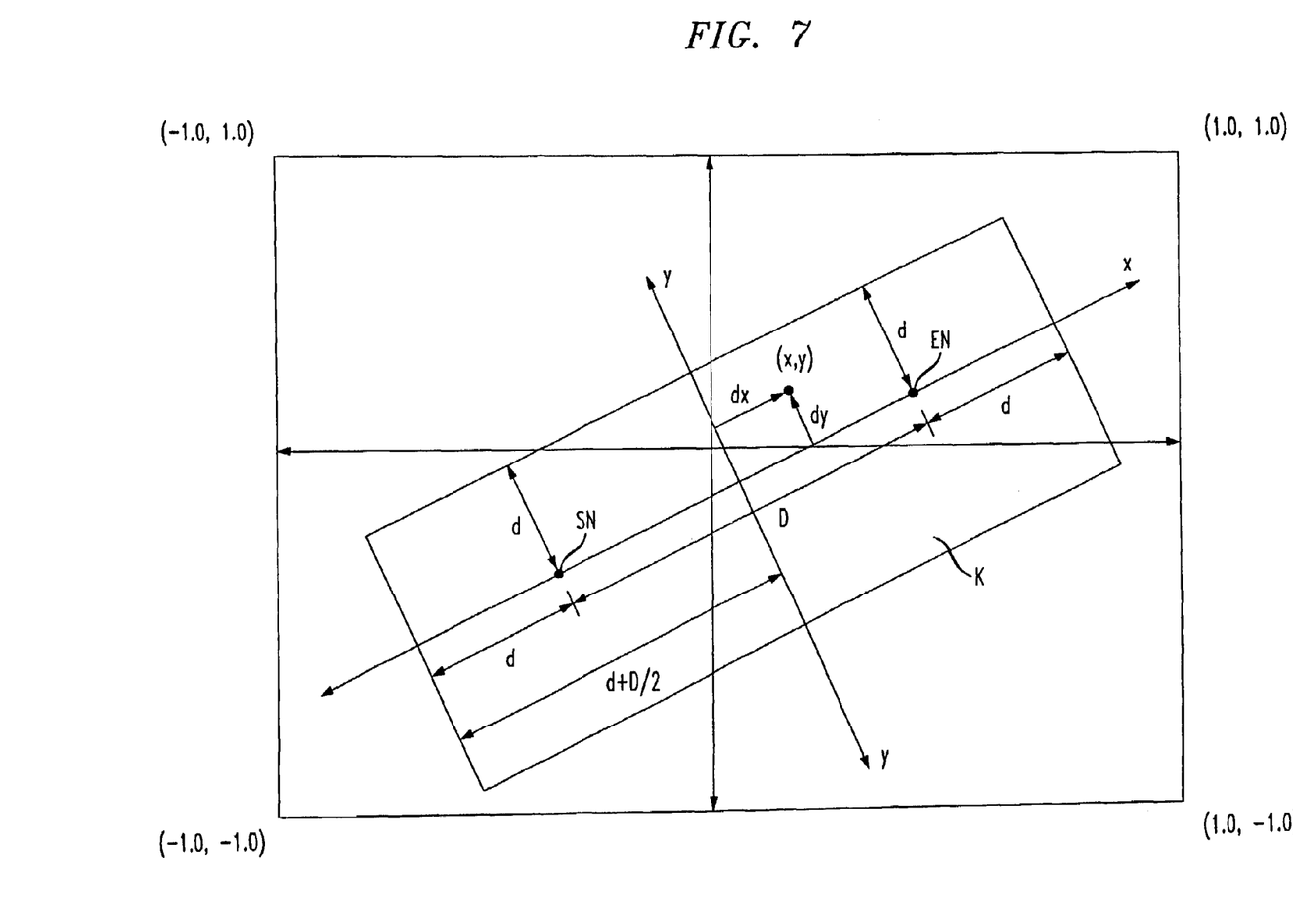
FIG. 7 graphically depicts a % Area window useful in understanding an embodiment of the invention.

FIG. 7 graphically depicts a % Area window useful in understanding an embodiment of the invention. In the case of a % Area window, the control parameter ($\delta$) comprises the perpendicular distance from a line connecting the start-node and end-node and the nearest point on the boundary of the selected area. Thus, using the % Area window, the network elements or nodes and links selected for subsequent processing by a shortest path algorithm comprise those nodes (or links to those nodes) within a distance $\delta$ of either the start-node, end-node or a line of distance D connecting the start and end-nodes. Returning to FIG. 7, a start-node SN and end-node EN are separated by a distance D. A shaded region or window (K) is defined by a distance $\delta$ around each of the start-node SN and end-node EN and straight line between the start-node SN and end-node EN. The outer rectangular boundary comprises the normalized representation (−1, −1 to +1, +1) of the entire network 140. The window (K) occupies a defined percentage area of the normalized network window (e.g., 5%). The inventors have determined that very good results may be achieved using a percentage of between approximately 3% and 10%, with 5% being preferred.

In one embodiment of the invention, a network operator selects a window to be utilized in calculating the shortest path between a start-node and an end-node. That is, rather than simply providing the start-node and end-node information to the network manager 120, the operator of a work station 130 or 132 provides information indicative of a window to be used in calculating the shortest path between the start-node SN and end-node EN. The operator may, for example, highlight a portion of a display of the network such that portions of the network are included in the network and portions of the network are excluded from the network. The included and excluded portions may be selected by the operator in response to known congestion or bandwidth over utilization, bandwidth under utilization, or other factors.

The network manager 120, in response to the selection of a window K provided by an operator, determines the distance (D) and control parameter ($\delta$) associated with the selected window. In the case of a % Area window, the control parameter ($\delta$) may be determined using equations 3 through 5 (where KA is the area of the window K). By rewriting equation 3 to produce equation 4, the control parameter ($\delta$) is provided by equation 5.

$$2\delta(D + 2\delta) = K_A \qquad \text{(equation 3)}$$

$$4\delta^2 + 2\delta D = K_A \qquad \text{(equation 4)}$$

$$\delta = \frac{-D + \sqrt{D^2 + 4K_A}}{4} \qquad \text{(equation 5)}$$

Referring to FIG. 7, a node denoted by its coordinate locations (x,y) is shown, where the X-axis is defined by a line passing through the start-node SN and the end-node EN, while the Y axis is defined by a line perpendicular to the X-axis and intersecting the X-axis at the midpoint between the start-node SN and end-node EN. It is noted that the coordinate of the node (x,y) is given by the standard rectilinear notation of dx and dy.

In one embodiment of the invention, the selection of spare network resources or links (step 420 of the method 400 of FIG. 4) is accomplished using the equations 6-22 (below). These equations are useful in determining whether a particular link should be included within the resources of the calculated window. Moreover, these equations provide a computationally efficient method for determining which communications links are within, illustratively, a window defined using the above-described % Area method.

It is assumed that a given point $(x_0, y_0)$ lies within a given rectangle if the shortest distance of that point from a line joining the start and end nodes is less than $\delta$, and the shortest distance of that point from the perpendicular bisector of the line joining the start and end nodes is less than $$\frac{D}{2} + \delta,$$

where D is the distance between the start and end nodes. This is shown in FIG. 6. Several terms used in equations 6-22 are defined as follows:

$(x_1, y_1)$ be the normalized location details of the start node of the circuit being provisioned;

$(x_2, y_2)$ is the normalized location details of the end node of the circuit being provisioned;

$(x_0, y_0)$ is the normalized location details of the node at one end of the link under consideration;

$d_1$ is the shortest distance between the point $(x_0, y_0)$ and the line joining the start and end nodes $(x_1, y_1)$, $(x_2, y_2)$; and $d_2$ is the shortest distance between the point $(x_0, y_0)$ and the perpendicular bisector for the st. line joining the start and end nodes $(x_1, y_1)$, $(x_2, y_2)$.

Therefore, it can be said that:

$$d_1 = |a_1 x_0 + b_1 y_0 + c_1| \quad \text{(equation 6)}$$

Where:

$$a_1 = \frac{a}{\sqrt{a^2+b^2}} \quad \text{(equation 7)}$$

$$b_1 = \frac{b}{\sqrt{a^2+b^2}} \quad \text{(equation 8)}$$

$$c_1 = \frac{c}{\sqrt{a^2+b^2}} \quad \text{(equation 9)}$$

Where:

$$a = m \quad \text{(equation 10)}$$

$$b = -1 \quad \text{(equation 11)}$$

$$c = y_1 - x_1 m \quad \text{(equation 12)}$$

Where:

$$m = \frac{(y_2 - y_1)}{(x_2 - x_1)} \quad \text{(equation 13)}$$

Then:

$$d_2 = |a_4 x_0 + b_4 y_0 + c_4| \quad \text{(equation 14)}$$

Where:

$$a_4 = \frac{a_3}{\sqrt{a_3^2 + b_3^2}} \quad \text{(equation 15)}$$

$$b_4 = \frac{b_3}{\sqrt{a_3^2 + b_3^2}} \quad \text{(equation 16)}$$

$$c_4 = \frac{c_3}{\sqrt{a_3^2 + b_3^2}} \quad \text{(equation 17)}$$

Where:

$$a_3 = \frac{(x_2 - x_1)}{(y_2 - y_1)} \quad \text{(equation 18)}$$

$$b_3 = -1 \quad \text{(equation 19)}$$

$$c_3 = y_3 + x_3 \left( \frac{(x_2 - x_1)}{(y_2 - y_1)} \right) \quad \text{(equation 20)}$$

Where:

$$x_3 = \frac{(x_1 + x_2)}{2} \quad \text{(equation 21)}$$

$$y_3 = \frac{(y_1 + y_2)}{2} \quad \text{(equation 22)}$$

To improve computational efficiency, the coefficients $a_1$, $b_1$, $c_1$ and $a_4$, $b_4$, $c_4$ are computed only once for each provisioned communication because they only depend on the normalized locations of start-node and end-node of the circuit being provisioned and do not depend on the normalized location details of each link.

It will be appreciated by those skilled in the art that the above-described equations (6-22) describe a computationally efficient method for selecting communications links for inclusion in the geographic window to be processed.

Figure 8:
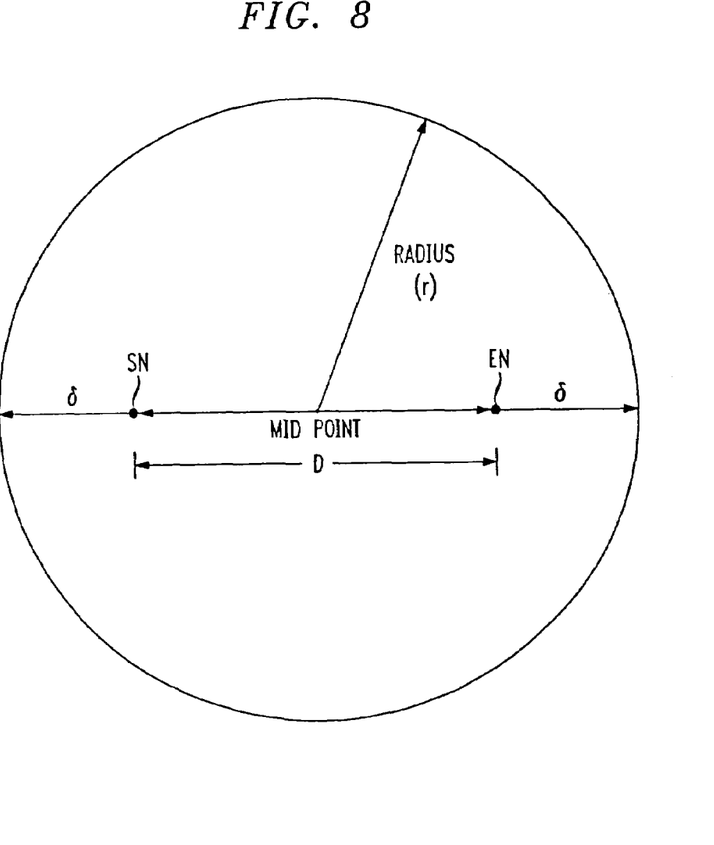
FIG. 8 graphically depicts a circular window useful in understanding an embodiment of the invention.

FIG. 8 graphically depicts a circular window useful in understanding an embodiment of the invention. In the case of a circular window, the center point of the circle is the midpoint of a line connecting the start-node SN and end-node EN. Thus, using the single circle window, the network elements or nodes and links selected for subsequent processing by the shortest path algorithm comprise those nodes within the circle defined by a radius R around the midpoint of the distance D, or those links connecting to at least one of the selected nodes.

Figure 9:
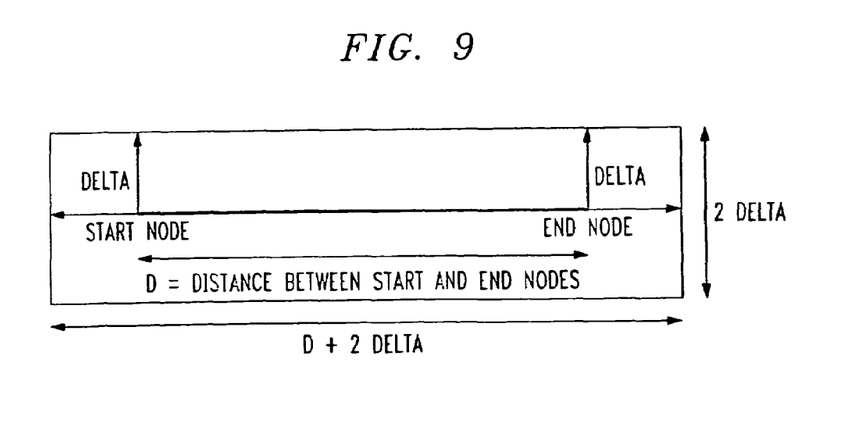
FIG. 9 graphically depicts a rectangular window useful in understanding an embodiment of the invention.

FIG. 9 graphically depicts a rectangular window useful in understanding an embodiment of the invention. The rectangular window is defined as having a width of 2($\delta$) and a length of D+2$\delta$ where D is the distance between the start-node SN and end-node EN.

Figure 10:
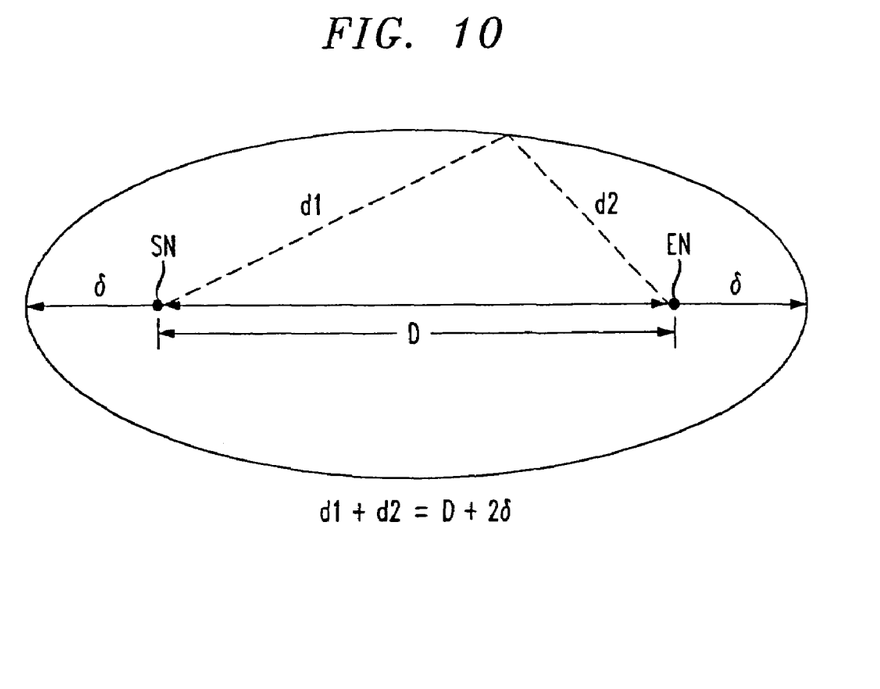
FIG. 10 graphically depicts an ellipsoid window useful in understanding an embodiment of the invention.

FIG. 10 graphically depicts an ellipsoid window useful in understanding an embodiment of the invention. A start-node SN and end-node EN are separated by a distance D. The boundaries of the ellipse are defined in the standard manner using two foci (SN and EN) as $d_1 + d_2 = D + 2\delta$, where $d_1$ is the distance from the start-node SN to the boundary of the ellipse, $d_2$ is the distance from the end-node EN to the boundary of the ellipse, D is the distance between the start-node SN and end-node EN and $\delta$ is the control parameter.

Figure 11:
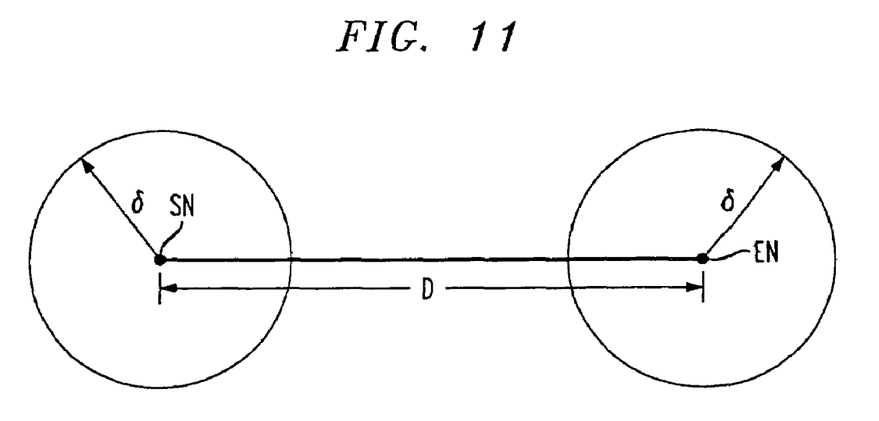
FIG. 11 graphically depicts a double circle window useful in understanding an embodiment of the invention.

FIG. 11 graphically depicts a double circle window useful in understanding an embodiment of the invention. In the case of a double circle window, the control parameter $\delta$ comprises the radius of a first circle having as its midpoint the start-node SN and the radius of a second circle having as its midpoint the end-node EN. Thus, using the double circle window, the nodes or links selected for subsequent processing are those within a distance $\delta$ of either the start-node SN or the end-node EN. To insure that a link between the start-node SN and end-node EN may be established, it is necessary to select sufficient intervening nodes.

It will be appreciated by those skilled in the art that the functions of the invention may be described in terms of graphical displays or images where an image on a display device is provided in which the entire communications network, or portions of the communications network, are displayed and graphically processed. However, it is noted that such display of the communication network or portions thereof is not necessary to the practice of the invention. Rather, descriptions relating to the display of the network or portions thereof are merely intended to illustrate the nature of the processing.

Thus, as discussed in more detail above, methods and apparatus according to the invention utilize a windowing function to define a sub-set or portion of the nodes, network elements or links therebetween. The defined sub-set or portion is then subjected to "shortest path" or "least cost" processing to determine an appropriate communications link, communications path or communications route between a start-node and end-node included within the sub-set or portion of the network being managed. While the above disclosure provides for % Area, circular, ellipsoid, multiple circle, rectilinear and other window functions or shapes, it will be appreciated by those skilled in the art that the teachings of the subject invention may be readily adapted based upon the peculiar topology of the network being managed. For example, in the case of a network having an unusual geographic shape, such as a network spanning an ocean where two portions of the network being managed are linked by a single fiber optic trunk, it will be appreciated that a double circle window function may be adapted to include only a portion of each of the portions divided by the ocean. That is, where a single or very small number of communications links must be used, given a topology of the network being managed, the shapes of the window function are adapted to accommodate that shape.

Although various embodiments which incorporate the teachings of the present invention have been shown and described in detail herein, those skilled in the art can readily devise many other varied embodiments that still incorporate these teachings. As such, the appropriate scope of the invention is to be determined according to the claims which follow herewith.

What is claimed is:

1. An apparatus for managing a communications network comprising a plurality of nodes, said apparatus comprising:
   means for representing each node within said network according to its respective geographic position;
   means for defining a window comprising a start-node, an end-node and a plurality of intervening nodes, each of said start-node, end-node and intervening nodes having at least one communication link to a respective adjacent node; and
   means for calculating, using said nodes included within said window, a shortest communication path between said start-node and said end-node,
   wherein said window includes a predefined percentage of the total geographic area occupied by said network and is selected from the group of shapes consisting of:
      a rectangle defined by a line segment beginning at said start-node and ending at said end-node, said line segment traversing a distance (D) and a rectilinear area about said line segment, said rectilinear area comprising those nodes approximately within a perpendicular distance ($\delta$) of said start-node, said end-node, or said line segment between said start-node and said end-node,
      a circle having a mid-point equidistant from said start-node and said end-node, said circle having a diameter greater than the distance between said start-node and said end-node; and
      an ellipse defined by the equation $d_1+d_2=D+2\delta$, where $d_1$ is the distance from the start-node SN to the boundary of the ellipse, $d_2$ is the distance from the end-node $E_n$ to the boundary of the ellipse, D is the distance between the start-node and the end-node, and $\delta$ is a control parameter.

2. The apparatus of claim 1, wherein said predefined percentage is in the range of approximately 3-10% of the total geographic area occupied by said network.

3. The apparatus of claim 2, wherein said predefined percentage is approximately 5% of the total geographic area occupied by said network.

4. The apparatus of claim 1 wherein said means for representing each node is a database.

5. The apparatus of claim 4 wherein said database contains normalized representations of each node.

6. The apparatus of claim 1 wherein said means for defining a window is a controller coupled to said means for representing each node.

7. The apparatus of claim 1 wherein said means for calculating is a controller processing a selected portion of nodes in the network according to a shortest path algorithm.

8. The apparatus if claim 7 wherein the shortest path algorithm in Dijkstra's algorithm.

9. The apparatus of claim 1, wherein said window is defined as a double circle.

10. The apparatus of claim 9, wherein said double circle window is further defined by a radius of a first circle having a midpoint at the start-node a radius of a second circle having a midpoint at the end-node.

* * * * *